United States Patent
Frigge et al.

(10) Patent No.: US 11,081,255 B2
(45) Date of Patent: Aug. 3, 2021

(54) HIGH-TEMPERATURE AND FLAME-RESISTANT COLORED ADHESIVE TAPE, USE OF A SUBSTRATE FOR ITS MANUFACTURE, AND CABLE HARNESS INCLUDING SUCH AN ADHESIVE TAPE

(71) Applicant: Coroplast Fritz Müller GmbH & Co. KG, Wuppertal (DE)

(72) Inventors: Christoph Frigge, Sprockhövel (DE); Gülay Wittig, Bochum (DE)

(73) Assignee: Coroplast Fritz Müller GmbH & Co. KG, Wuppertal (DE)

( * ) Notice: Subject to any disclaimer, the term of this patent is extended or adjusted under 35 U.S.C. 154(b) by 940 days.

(21) Appl. No.: 15/386,863

(22) Filed: Dec. 21, 2016

(65) Prior Publication Data
US 2017/0198173 A1    Jul. 13, 2017

(30) Foreign Application Priority Data

Jan. 7, 2016  (DE) .................... 10 2016 000 080.5
Dec. 16, 2016 (DE) .................... 10 2016 124 608.5

(51) Int. Cl.
*H01B 7/29*    (2006.01)
*H01B 7/00*    (2006.01)
(Continued)

(52) U.S. Cl.
CPC .............. *H01B 7/292* (2013.01); *C09J 7/21* (2018.01); *C09J 9/00* (2013.01); *C09J 121/00* (2013.01);
(Continued)

(58) Field of Classification Search
None
See application file for complete search history.

(56) References Cited

U.S. PATENT DOCUMENTS

2005/0227559 A1* 10/2005 Ternon ............... C09J 7/21
                                                       442/149
2009/0159227 A1*  6/2009 Levit ................ D21H 13/10
                                                       162/146
(Continued)

FOREIGN PATENT DOCUMENTS

DE    2055 211       5/1972
DE    19523494 A1 *  1/1997 ............... C09J 7/21
(Continued)

OTHER PUBLICATIONS

Abstractor DE 19523494 C2 (Year: 1998).*
(Continued)

*Primary Examiner* — Frank D Ducheneaux
(74) *Attorney, Agent, or Firm* — Dickinson Wright PLLC

(57) ABSTRACT

A colored adhesive tape (1), in particular a yellow, orange-colored, or black adhesive tape (1), preferably a cable wrapping tape, with a temperature class of at least T3 (LV 312), including a textile substrate with a polymer plastic substrate (4, 4a, 4b), on which an adhesive material (5, 5a, 5b) is applied. In order to improve the temperature stability of the tape, while maintaining advantageous properties, the color of at least a part of the substrate (4, 4a, 4b) is formed by the inherent color of the polymer plastic material. The tape is preferably substrate formed of a polymer plastic materials which are aromatic, nitrogen-containing polymers (Continued)

from the group of polyoxadiazoles (POD), polybenzobisoxazoles (PBO) or polybenzimidazoles (PBI) (4, 4*a*, 4*b*). The adhesive tape (1) may be used as a cable harness (3).

37 Claims, 5 Drawing Sheets

(51) Int. Cl.

| | | |
|---|---|---|
| *H01B 7/295* | (2006.01) | |
| *C09J 7/21* | (2018.01) | |
| *C09J 183/04* | (2006.01) | |
| *C09J 9/00* | (2006.01) | |
| *C09J 121/00* | (2006.01) | |
| *C09J 133/00* | (2006.01) | |
| *C09J 183/00* | (2006.01) | |
| *C09K 5/00* | (2006.01) | |
| *C08K 5/00* | (2006.01) | |

(52) U.S. Cl.
CPC ........... *C09J 133/00* (2013.01); *C09J 183/00* (2013.01); *C09J 183/04* (2013.01); *H01B 7/0045* (2013.01); *H01B 7/295* (2013.01); *C08K 5/0041* (2013.01); *C09J 2203/302* (2013.01); *C09J 2301/41* (2020.08); *C09J 2400/263* (2013.01); *C09J 2421/00* (2013.01); *C09J 2433/00* (2013.01); *C09J 2479/026* (2013.01); *C09J 2483/00* (2013.01)

(56) References Cited

U.S. PATENT DOCUMENTS

| | | | |
|---|---|---|---|
| 2010/0227102 A1 | 9/2010 | Keener et al. | |
| 2013/0134197 A1* | 5/2013 | Siebert | B26D 3/282 225/1 |
| 2014/0065377 A1 | 3/2014 | Horvath et al. | |
| 2016/0168427 A1* | 6/2016 | Lodde | C09J 7/29 428/220 |
| 2016/0272786 A1* | 9/2016 | Mussig | C08K 5/29 |

FOREIGN PATENT DOCUMENTS

| | | | | |
|---|---|---|---|---|
| DE | 196 23 411 A1 | 12/1997 | | |
| DE | 10 2013 108 917 A1 | 4/2014 | | |
| EP | 1 315 781 B1 | 1/2005 | | |
| EP | 1 607 459 B1 | 12/2005 | | |
| EP | 2 546 317 A1 | 1/2013 | | |
| WO | WO-2014060457 A1 * | 4/2014 | ............... | B32B 7/12 |
| WO | WO-2015071450 A1 * | 5/2015 | ............... | C08K 5/29 |

OTHER PUBLICATIONS

German Examination Report —dated Oct. 24, 2016.
Wallenberger, Dr. F. T., "The Chemistry of New Heat-Resistant Films and Fibers," Angew. Chem. Internat. Edit. / vol. 3 (1964) /No. 7, pp. 460-470.

* cited by examiner

HIGH-TEMPERATURE AND FLAME-RESISTANT COLORED ADHESIVE TAPE, USE OF A SUBSTRATE FOR ITS MANUFACTURE, AND CABLE HARNESS INCLUDING SUCH AN ADHESIVE TAPE

CROSS REFERENCE TO RELATED APPLICATIONS

This application claims priority to German Patent Application Nos. 10 2016 000 080.5, filed Jan. 7, 2016 and 10 2016 124 608.5, filed on Dec. 16, 2016.

FIELD OF THE INVENTION

The invention relates to a colored adhesive tape, in particular a yellow, orange-colored, or black adhesive tape, preferably a cable wrapping tape, with a temperature class of at least T3 according to LV 312, including a textile substrate composed of at least one polymer plastic material, on which an adhesive material is applied to at least one-side. Furthermore, the invention relates to the use of a substrate for manufacturing such an adhesive tape as well as a cable harness including such an adhesive tape.

BACKGROUND

For bundling and for protection of lines, e.g., in the automobile field, these are often provided with protective covers. Hoses, tubes, and, advantageously, cable wrapping tapes are used here.

Adhesive tapes, also those of the mentioned type, must meet uniform standards with respect to their use properties, in particular the standard LV 312 (10/2009). This standard classifies adhesive tapes with respect to their properties for uses in the automobile industry, preferably for bundling and wrapping of lines and line sets. The mentioned standard was developed by the representatives of the automobile manufacturers AUDI AG, BMW AG, Daimler AG, Porshe AG, and Volkswagen AG.

When this standard LV 312 or other standards to which reference is made, for example, in LV 312, such as, for example, EN 1942, EN 14410, EN 1939, are mentioned below, the versions in effect at the time of the application are always meant.

To summarize, these are the following versions: LV312 10-2009, DIN EN 1942 06-2008, DIN EN 14410 06-2003, DIN EN 1939 12-2003, ISO 3795 10-1989, DIN 55943 10-2001, DIN ISO 18451 07-2014, DIN ISO 6722 10-2011, 3N 2286-2 07-1998 and DIN EN ISO 9237 12-1995.

The usage properties of adhesive tapes include, for example, the adhesive force on the tape backs and the unrolling force as well as the hand tearability. Further usage properties are the adhesive force on certain materials, the thickness, the elongation at break, the breaking force, the tear resistance, the flagging, as well as the abrasion resistance, the temperature resistance, and the flame resistance.

For an increased abrasion resistance, woven fabrics or combinations of woven fabrics and fleece materials are used. Woven fabrics based on polyester or polyamide are common, for example. Thus, high abrasion resistances are achieved. Due to the woven fabric composition, however, the area of use is limited to consistent load temperatures of at most 150° C. With a test of the flame resistance according to LV 312/ISO 3795 the highest burn class A is not achieved. For higher temperature requirements, adhesive tapes with glass-woven fabric substrates are therefore used. These are usable up to 250° C. without problems, and as a rule meet burn class A according to LV312/ISO 3795, but have practically no abrasion resistance and thus do not display the desired protection effect.

For most application cases cable wrapping tapes are colored black using colorants such as pigments. The problem of keeping this coloring stable under high temperature loads is discussed in detail in EP 1 607 459 B1. Carbon black is used here in particular as colorant, which is introduced into the fibers and yarns of the substrate woven fabric by a spinning-jet coloring.

Above all for use in electric vehicles, high voltage lines and in particular also the adhesive tapes used for jacketing these lines are embodied in signal colors, e.g., yellow or orange. For safety reasons it is necessary that these colors are still recognizable even after high temperature load. A certain color change here is definitely accepted, however not a discoloration or a browning.

An adhesive tape of the above-described type is described in EP 2 546 317 B1. This is comprised of a textile substrate and of an adhesive layer applied to at least one side of the substrate, wherein the substrate is colored by a mixture of colorants and/or pigments. The mixture is comprised of yellow and red colorants and/or pigments, wherein the yellow colorant and/or the yellow pigment is based on anthraquinone, and the red colorant and/or the red pigment on an azo compound or comprises a mixture of anthraquinone compounds and azo compounds.

DIN 55943:2001-10 and also DIN ISO 18451-1:2014-07 (unchanged in this regard) are to be referred to with respect to the difference between dyes and pigments, scoring to which all chromophoric substances are referred to as colorants. These are then divided into soluble dyes and insoluble pigments.

In EP 2 546 317 B1 the problem is undertaken here to realize adhesive tapes with signal colors using the substrate materials known to be used even with high temperature classes. Here it is emphasized that with "standard orange pigments with azo bases," whose use for orange coloring of a textile adhesive-tape substrate appeared to be the most obvious technical solution, only a low temperature class could be achieved, both with piece coloring and also with spinning jet coloring. According to the above referenced patent, a high temperature stability according to class T3 (150° C.) has also been achieved by a mixture of an azo- and an anthraquinone-pigment.

However, with colored woven fabrics it has been decided to advise against a spinning jet coloring, for example practiced according to EP 1 607 459 B1 for carbon black as colorant, since color pigments/dyes thus introduced in a substrate show signs of degeneration, i.e., a discoloring. Instead the coloring of the fibers, filaments, or yarns of the textile substrate occur according to EP 2 546 317 B1 by a dispersion coloring. With the dispersion coloring, poorly soluble or practically insoluble synthetic colorants are used in water. However, since the coloring also occurs from an aqueous medium, the colorant is ground as finely as possible and placed in a color bath heated to approximately 100° C. The color particles finely distributed therein float up and then diffuse in the fibers, where they dissolve and should enter into a fixed connection.

With the, continuously (e.g., Thermosol method with integrated Foulard) or discontinuously (so-called beam dyeing or using a "high-pressure jigger") running, dispersion coloring white woven fabric is impinged in an impregnating bath with a colorant. Here dispersants are used as aids to maintain a uniform distribution of the colorant in the dispersion. With this coloring method, the colorant initially lies around the fiber in order to then penetrate into it under the influence of heat and/or pressure. In preparation for the coloring process, for facilitating the penetration a resizing or removal of oils and/or a prefixing of the woven fabric can take place. With the continuous coloring in the Thermosol method a thermal fixing process of the coloring takes place downstream.

Disadvantageously anthraquinone, which is to be used according to EP 2 546 317 B1, is classified as a harmful material. The material is a potential carcinogen; it is thus suspected of causing cancer.

SUMMARY AND INTRODUCTORY DESCRIPTION OF INVENTION

The object of the present invention is to improve a colored adhesive tape of the above-mentioned type while maintaining advantageous use properties. In particular, an adhesive tape should be made available here with improved temperature stability and also flame resistance, which preferably has a high abrasion resistance. If possible here the use of materials that are alarming with respect to health, such as anthraquinone, should also be able to be avoided. The color of the adhesive tape should be in particular yellow, orange-colored or black.

This object is inventively achieved by the color of at least one part of the textile substrate being formed by the inherent color of the polymer plastic material.

According to the invention it can also be additionally or alternatively provided here that the polymer plastic material of the textile substrate is or at least comprises an aromatic nitrogen-containing polymer from the group of polyoxadiazoles (POD).

The use of colorants, such as carbon black, azo pigments or anthraquinone or others can thus be completely omitted for the coloring of the substrate. Since the color is formed by the polymer plastic material of the textile substrate, all of the problems of the search for a suitable coloring method are thus advantageously omitted.

According to the invention an aromatic, nitrogen-containing polymer can be used as polymer plastic material of the textile substrate for producing the adhesive tape, which polymer originates from the group of polyoxadiazoles (POD), the polybenzobisoxazoles (PBO) or the polybenzimidazoles (PBI). The numerous conjugated double bonds present in these polymer plastics form a sort of large chromophoric system such that the textile substrate material appears colored without the use of further pigments or colorants.

Furthermore, in particular, by copolymerization; will color-intensifying functional groups can be introduced into the polymer structure of the plastic, which functional groups effect a color shift to the desired hue. Due to mesomeric and inductive effects of auxochromic groups, such as, for example, —OH, —NH$_2$, —NHR, —NR$_2$ or —OR (with R as aliphatic or aromatic radical) a delocalization of a so-called π electron system formed in the conjugated double bonds of the chromophores is strengthened and a bathochromic shift, also called redshift, occurs. Due to this shift of the absorption spectrum from the UV range into the longer-wavelength, lower-energy, visible range of the electro magnetic spectrum, polymers previously transparent for the human eye can be perceptible optically and in terms of color.

In this way, without the use of, for example, red and yellow colorants, all RAL orange colors required according to the invention can be established: RAL 2000 yellow-orange, RAL 2001 red-orange, RAL 2002 blood orange, RAL 2003 pastel orange, RAL 2004 pure orange, RAL 2005 light orange, RAL 2007 light-bright orange, RAL 2008 bright-red orange, RAL 2009 traffic orange, RAL 2010 signal orange, RAL 2011 deep orange, RAL 2012 salmon orange, RAL 2013 pearl orange.

Colors that are referred to here as RAL colors are standardized according to a color catalog. The name RAL comes from Reichs-Ausschuss für Lieferbedingungen (Imperial Commission for Delivery Terms and Quality Assurance in English), which was founded in Berlin in 1925 and served to streamline the German economy. Each color of the color catalog is associated with a four-digit color number. The goal of the standardization of colors is to allow customers and suppliers to mutually communicate without having to exchange color samples, but rather only an RAL number. The RAL colors can also be seen on the internet at https://de.wikipedia.org/wiki/RAL-Farbe[TN: English page: https://en.wikipedia.org/wiki/RAL_colour_standard].

In particular according to the invention, a color RAL 2003 pastel orange or also non-standardized intermediate colors can preferably be achieved in the substrate of the adhesive tape. Likewise according to the invention it is possible in a simple manner to configure specified colors in the adhesive tape substrate within the RAL 1000 series (yellow), the RAL 3000 series (red), as well as the RAL 8000 series (brown) as well as black.

Another possibility is to identify the colors by the so-called "Pantone Matching System (PMS)." Here PMS is also the name of a, like the RAL system, internationally popular color system that is primarily used in the graphic and printing industry. It was developed in 1963 by Pantone LLC, a US-American company with headquarters in Carlstadt, N.J. The Pantone Matching System is based on 14 basic colors that when mixed with each other in different color proportions produce all other colors represented in the system. The colors are printed on at least three different types of paper, namely coated, uncoated, and matte, in order to represent the color impression of Pantone colors, also defined by a number code, depending on the printed medium. Thus the respective color impression can vary significantly in part depending on the surface quality of a paper. For this reason Pantone colors are defined by the number code and, when they are printed on paper, also with the corresponding initial for the type of paper used (C=coated, U=uncoated, M=matte). The color RAL 2003 preferred in the context of the invention corresponds in PMS to the color 1575. Furthermore, there are custom and basic colors in the Pantone Matching System that have no numerical designation, but rather are given names. Among other things Pantone colors are used this way to define colors of flags, for example, in the European flag the blue by the color "Pantone Reflex Blue" and the yellow of the twelve stars by the color "Pantone Yellow."

To increase the UV resistance, the polymers, fibers, or yarns can be formed with additional stabilizers. Thus polyoxadiazole-fibers or -yarns can be equipped with stabilizers such as the potassium, or sodium-salts of the m, or p,azobenzoldicarbon acids.

An advantage of the invention consists in that due to the inventive use of colored but colorant-free polymer substrates in the adhesive tape no color components are present that can reduce the compatibility of the inventive adhesive tape with a line material. Thus also later with a bearing or loading of the adhesive tape with high temperatures a discoloration of the textile materials, or a colorant migration, cannot occur.

All factors which disadvantageously encourage an increased colorant migration, such as a necessary color excess or the use of small soluble color molecules and color accelerants in disperse dyeing, such as a possible disadvantageous effect of the UV radiation on the adhesive coating applied to the substrate, such as the softening agent possibly used as solvent with soluble materials from the polymer of a conductor insulation, which is jacketed by the inventive adhesive tape, or such as the chemical composition of the conductor isolation itself, can thus be successfully counteracted by the invention.

Instead, the invention makes possible the manufacture of corresponding cable harnesses having color-stable adhesive tape and here also color-stable conductor jacketing. The electrical lines and the further components for cable sets here are divided into temperature classes in a known manner in the automobile industry for establishing their maximum continuous service temperature, which are reproduced in table 1. Depending on the area of use in the automobile industry an inventive adhesive tape can be advantageously used if or a cable bundle jacketed by the adhesive tape must have a resistance up to temperatures of more than 125° C., i.e., if it is to be used under the conditions of at least a temperature class T3 (C), preferably however of a temperature class T4 (D) or T5 (E), according to LV 312.

TABLE 1

Classification of temperature classes according to LV 312

| Class | Continuous service temperature in ° C. (3000 h) |
|---|---|
| T1 (A) | −40 to 85 |
| T2 (B) | −40 to 105 |
| T3 (C) | −40 to 125 |
| T4 (D) | −40 to 150 |
| T5 (E) | −40 to 175 |

Furthermore, the invention makes possible the manufacture of color-stable adhesive tapes of the highest burn class according to the following Table 2.

According to LV312 a minimum flame resistance of a line set should ensure that the spreading of a fire is impeded but at least however is not promoted. Therefore in a corresponding test the adhesive tape is tested in connection with defined lines. The test occurs in conformance with ISO 3795 and FMVSS 302, wherein line sets are tested that are wrapped with 50% overlapping, made from seven lines with defined cross-section and defined material.

TABLE 2

Classification of flame resistance according to LV 312

| Burn class | Requirement |
|---|---|
| A not flammable | The flame goes out as soon as the burner is removed |
| B self-extinguishing | The flame goes out before the first reference mark is reached |
| C moderate abrasion protection | Burn speed ≤ mm/min |
| D high abrasion protection | Burn speed >100 mm/min |

A class division is effected corresponding to the test result as is reproduced in Table 2. Inventive adhesive tapes advantageously achieve the fulfillment of burn classes A and B.

The yarns in the substrate of an inventive adhesive tape can be composed both of staple fiber yarns and of filament yarns. In comparison to woven fabrics made from staple fiber yarns, woven fabrics made from filament yarns have a higher abrasion resistance.

With respect to the fiber strength, and thus the abrasion resistance of textile substrates made therefrom, with the inventive substrates it is advantageous that, since from the start they are colored in a material-immanent manner, so that a fiber damage cannot occur as, for example, with dispersion coloring in the color bath.

For example, with woven fabrics that are nominally identical with respect to yarn fineness and yarns count the inventive woven fabric has a higher abrasion resistance since a disadvantageous damage of the yarns due to a color treatment is completely precluded.

Particularly preferably a part of the fibers or all fibers can be partially or completely comprised of the inventively colored polymer material. Thus the yarn used for woven fabric production can in particular according to the invention be comprised exclusively of polyoxadiazole (POD), polybenzobisoxazole (PBO), or polybenzimidazole (PBI), but also from a mixture of these polymers and/or a copolymer of POD, PBO, or PBI.

In further variants the yarn can contain fibers of a further textile material or the woven fabric can contain yarns made from further textile materials that do not originate from the above-mentioned groups. These fibers or yarns can be comprised, for example, of a synthetic or natural polymer, in particular from a polyamide (PA), polyester (PES), special polyethylene terephthalate (PET), aramid (m-aramid or p-aramid), such as poly(p-phenylene terephtalamide) (PPTA) or poly(m-phenylene terephthalamide) (PMPI), rayon, polyvinyl alcohol (PVAL), polyvinyl acetate (PVAC), polyetheretherketone) (PEEK), polyphenylene (PPP), polyphenylene oxide (PPO), polyphenylene sulfide (PPS), polyphenylene ether (PPE), wherein combinations of the above-mentioned materials are also possible. Strength increases and further increases of the temperature- and flame-resistance are thereby possible.

For example, polyester fibers are advantageous since they have, for example, a low density, a high ductility and elongation at break, very good dielectric behavior, a low water absorption, and low wear. In particular, although polybutylene terephthalate (PBT) can also be used, it is possible here that a part of the proportion of polyester fibers present or all of the proportion of polyester fibers present are partially or completely comprised of polybutylene terephthalate (PET).

The quantity proportion of POD, PBO, PBI, and/or the corresponding copolymers within the textile hybrid system can be 50 to 100 mass percent, in particular 55 to 80 mass percent.

Furthermore the yarn can contain fibers of a non-textile material or the woven fabric can contain non-textile yarn made from such fibers.

Here these can be, for example, metal fibers, carbon fibers, glass fibers, or basalt fibers, wherein combinations of such fibers or yarns with one another or with other materials are also possible.

By combination with a suitable adhesive tapes can be manufactured that combine a good abrasion resistance with a high temperature- and flame-resistance in the desired manner. Silicone adhesives are suitable in particular here as temperature-resistant adhesives.

The abrasion resistance is determined according to LV 312 following DIN ISO 6722 by the adhesive tape first being adhered to a mandrel (metal rod) with 5 mm diameter. Using a scraping tool that has a needle diameter of 0.45 mm under a weight force of 7 N the number of strokes is then determined that is required to rub through the adhesive tape.

With respect to the abrasion resistance the classification reproduced in the following Table 3 is provided here in LV 312.

TABLE 3

Classification of abrasion classes according to LV 312

| Abrasion class | Requirement on 5 mm mandrel |
|---|---|
| A no abrasion protection | <100 strokes |
| B slight abrasion protection | 100-499 strokes |
| C moderate abrasion protection | 500-999 strokes |
| D high abrasion protection | 1000-4999 strokes |
| E very high abrasion protection | ≥5000-14999 strokes |
| F extremely high abrasion protection | ≥15,000 strokes |

In particular the adhesive tape can have at least an abrasion of class C according to the standard LV 312 (10/2009). This means that the adhesive tape advantageously withstands at least 700 to 800 strokes until it is rubbed through. In the some of the examples to be described below class D would even be achieved.

The good abrasion resistance of an adhesive tape is advantageous for application areas wherein the adhesive tape is subjected to a high mechanical load. For further increase of the abrasion resistance combinations of woven fabrics with fleece materials can preferably be used wherein at least either the woven fabric or the fleece is colored according to the invention.

Woven fabrics preferably used as substrate according to the invention are known. Thus for example woven fabrics under the trade name ZYLON including PBO fibers are used for ballistic protection vests and woven fabrics with PBI fibers are used for firefighter jackets. Woven fabrics including POD fibers are used under the trade name ARSELON for high-temperature filters in metallurgy, in cement processing, and in asphalt manufacture. As a rule relatively thick and heavy woven fabrics are used for this purpose, since properties such as tear resistance, stiffness or insulating properties are important for these applications. For a use in the adhesive tape field, in particular in the field of cable wrapping, these woven fabrics are not to be used in unaltered form. Their high weight would be opposed to the general desire for weight savings in automobiles, their large thickness would be disadvantageous in narrow installation spaces and their coarse web structure opposes the abrasion requirements.

According to the invention it is instead preferred that the textile substrate comprises a woven fabric which in particular comprises a plain weave, wherein in particular the warp- and weft-thread count is each greater than 20 per cm and preferably falls at least 25 per warp and/or weft. The yarn strength here should in particular be smaller than 600 dtex and preferably fall in the range from 200 dtex to 400 dtex. 80 per cm, preferably 60 per cm and particularly preferably 45 per cm should respectively be viewed as the upper limit of the warp and weft-thread counts.

BRIEF DESCRIPTION OF THE DRAWINGS

The invention shall be explained in more detail based on the exemplary embodiments depicted in the drawings.

In the various Figures of the drawings identical parts are always provided with the same reference numbers, so that they are each generally described only once.

DETAILED DESCRIPTION

For the subsequent description it is emphasized that the invention is not limited to the exemplary embodiment and not to one or more features here of described feature combinations, rather each individual feature of the exemplary embodiment, even detached from all others in the context of partial features described therewith, is in itself of meaning for the object of the invention. Thus, for example, the features of the adhesive-tape properties listed in Tables 4 and 5 below are not necessarily associated with one another.

In particular the use of an inventive textile substrate whose polymer plastic material is an aromatic, nitrogen-containing polymer preferably from the group of polyoxadiazoles (POD) or also from the group of polybenzobisoxazoles (PBO) or of polybenzimidazoles (PBI), in particular of the inventive adhesive tape, is also attributed an independent inventive meaning.

Figure 1:
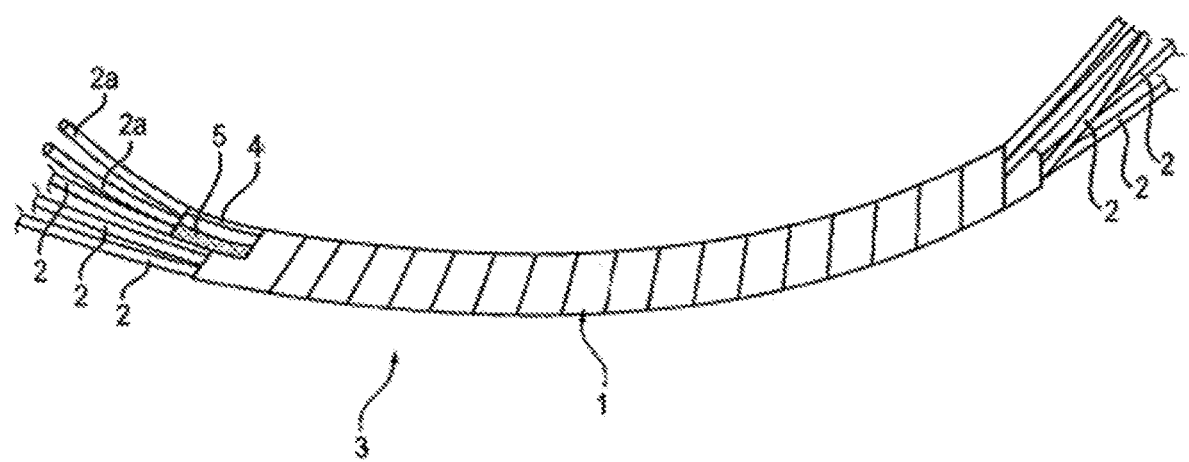
FIG. 1 shows a depiction of a cable harness wrapped with an inventive technical adhesive tape.

As FIG. 1 first of all illustrates, which shows a preferred application case of an inventive adhesive tape 1 for jacketing of cable sets, i.e., a cable-wrapping tape, an inventive adhesive tape is advantageously suitable for jacketing strands 2 of electrical lines whereby; in the depicted case by a helical wrapping; a cable harness 3 can be produced, in particular for the automobile industry.

The inventive adhesive tape 1 here comprises a band-shaped textile colored substrate 4 and an adhesive layer 5 applied one-side on the substrate 4, preferably comprised of a pressure-sensitive adhesive. The textile substrate 4 comprises at least one polymer plastic material, wherein the color of the substrate 4 is formed preferably completely, but at least but portions thereof, by the inherent color of the polymer plastic material.

The inventive adhesive tape 1 combines a high abrasion resistance, such as is known from cable winding tapes manufactured on the basis of polyester woven fabrics, with an increased temperature and flame resistance, wherein the adhesive tape 1 is preferably embodied in the colors yellow, orange, or black, and the polymer plastic material of the substrate 4 is a textile, in particular a woven fabric based on an aromatic, nitrogen-containing polymer from the group of polybenzobisoxazoles (PBO), the polybenzimidazoles (PBI), or the polyoxadiaxoles (POD).

Figure 2:
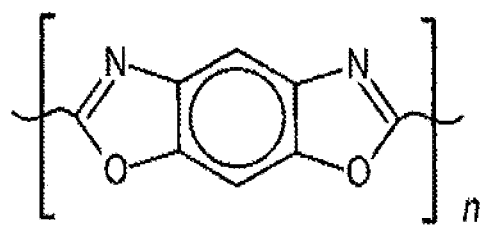
FIG. 2 shows a structural formula that exemplarily stands for a first group of plastics usable in the context of the invention as material of the substrate.
Figure 3:
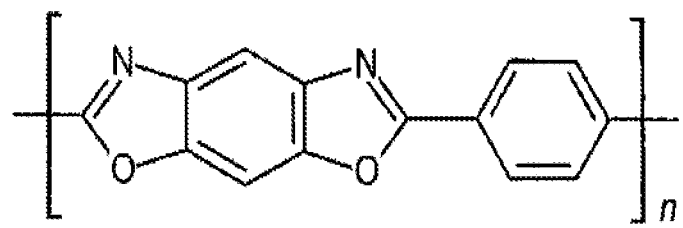
FIG. 3 shows a structural formula of an embodiment of plastic preferably usable in the context of the invention as yellow material of the substrate.

As an example for polybenzobisoxazoles (PBO) a general structural formula of poly (2,6-benzobisoxazole) is depicted in FIG. 2, which represents a plastic preferably usable in the context of the invention as material of the substrate 4. Polybenzobisoxazoles (PBO), which contain aliphatic or alicyclic groups between the individual benzobisoxazole groups, are largely colorless. In contrast, such a large chromophoric system arises with the use of a woven fabric made from the poly(p-phenylene-2,6-benzobisoxazole) depicted in FIG. 3, trade name ZYLON, due to the many conjugated double bonds, that without addition of further pigments or dyes a yellow color is achieved as a temperature-stable, immanent property. A further color shift into the longer wavelength range is possible here, as mentioned above, by the manufacture of suitable copolymerizates.

Figure 4:
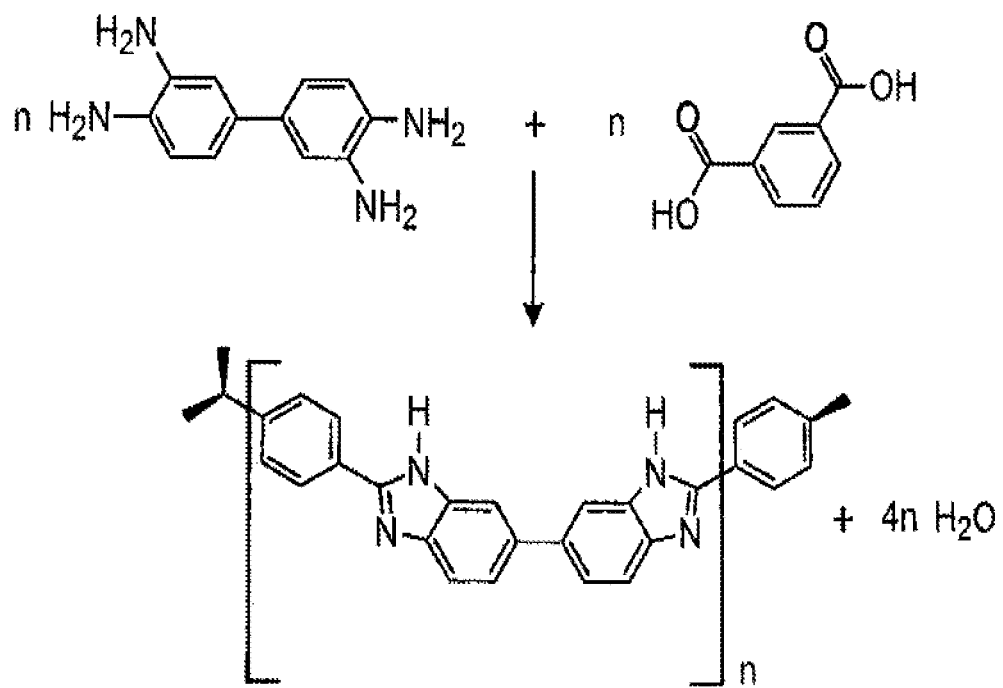
FIG. 4 shows a chemical equation of the manufacturing of a plastic group preferably usable in the context of the invention as material of the substrate.

FIG. 4 shows a general chemical equation for a polycondensation reaction tetraaminobiphenyl (left) and isophthalic acid (right) under dehydration for manufacture of polybenzimidazole (PBI), which also represents a plastic preferably usable in the context of the invention as material of the substrate 4. Due to its extensive chromophoric system Polybenzimidazole (PBI) already has a yellow-brown color desired for many applications in the automobile sector.

Figure 5:
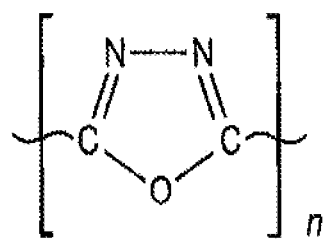
FIG. 5 shows a structural formula that exemplarily stands for a further embodiment of a plastic group preferably usable in the context of the invention as material of the substrate.
Figure 6:
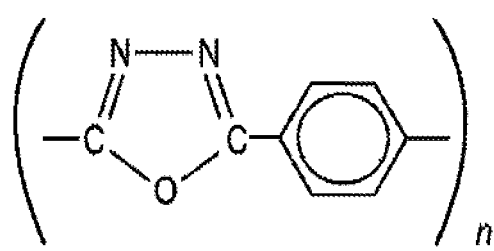
FIG. 6 shows a structural formula of an embodiment of a plastic preferably usable in the context of the invention as yellow material of the substrate.
Figure 7:
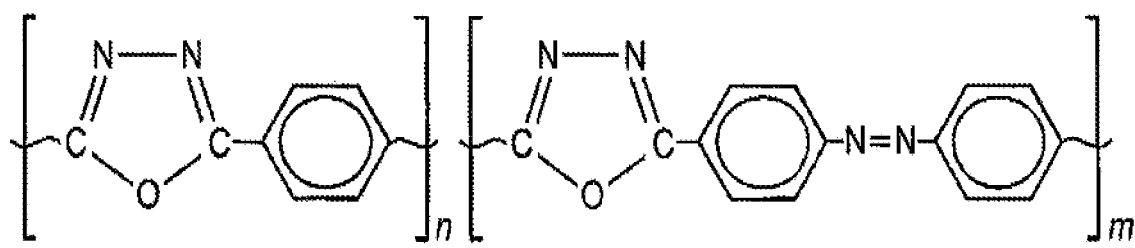
FIG. 7 shows a structural formula of an embodiment of a plastic preferably usable in the context of the invention as orange-colored material of the substrate.

Finally FIG. 5 shows, as a further example for a material of the substrate 4, which represents a preferably usable plastic, a general structural formula of polyoxadiazole (POD). Polyoxadiazoles (POD), which contain aliphatic or alicyclic groups between the individual oxadiazole groups, are largely colorless. With the use of a woven fabric made from poly-1,4-phenylen-1,3,4-oxadiazole, as depicted in FIG. 6, trade name ARSELON, such a large chromophoric system arises in contrast due to the many conjugated double bonds that the woven fabric already has a yellow color without the addition of further pigments or dyes. If during the manufacture of the base polymers copolymerization occurs with 0.5-5 mass percent (based on the base polymer), preferably with 1-3 mass percent (based on the base polymer), poly-4,4'-azobenzole-1,3,4-oxadiazole, shown in the structural formula in FIG. 7, trade name ARSELON S- or poly-3,3'-azobenzole-1,3,4-oxadiazole, then due to the azo groups a bathochromic shift is achieved up to a preferably desired orange hue RAL 2003. In all of these cases the desired yellow or orange color is an inherent, temperature-stable material property so that no additional coloring with temperature sensitive-dyes or pigments is required.

However, in the context of the inventive use of in particular colorless or also colored polyoxadiazoles (POD) it can optionally be provided that a coloring or color change using dyes or pigments occurs. Thus, for example, colorless or also orange colored POD fibers or POD woven fabrics can be colored as needed with black dyes or pigments, such as, for example, carbon black, without the advantageous high temperature stability, flame resistance, and abrasion resistance thereby being lost. A dispersion or spinning-jet-coloring with color pigments can occur. If dye is used as colorant then depending on the solubility properties of the dye the coloring can take place in an aqueous solvent or in an organic solvent, such as an alcohol, ketone, or oil, or in suitable mixtures. Basic or acidic solutions can be used. Furthermore, coloring accelerants, so-called carriers, can optionally be used together with surfactants, which carriers cause a swelling of the fiber material and can thereby facilitate the diffusion of the dyes. Aromatic compounds, such as, for example, phenol, phenylphenol, salicylic acid, including their derivatives or xylols, come into consideration as such coloring accelerants. However, it is to be noted that the aromatic, nitrogen containing polymers from the group of the polyoxadiazoles (POD), the polybenzobisoxazoles (PBO) or the polybenzimidazoles (PBI) represent material groups that are difficult to dye. However a carrier can advantageously be used here that contains N-cyclohexyl-2-pyrrolidone. Here a mixture of N-cyclohexyl-2-pyrrolidone with an alkyl- or aryl-benzoate, in particular with methyl benzoate, is preferred, wherein the mixture can be used as a solution or suspension. A preferred mass ratio of N-cyclohexyl-2-pyrrolidone to the alkyl- or aryl-benzoate here can fall in the range from 2:3 to 8:1.

Table 4 gives an overview of the woven fabrics usable as polymer plastic materials of the substrate 4 for the manufacture of inventive adhesive tapes 1 and the properties of these woven fabrics.

It can be seen from table 4 that the thread counts of the warp of a preferred fabric for the substrate 4 can vary in the range from 8 per cm to 42 per cm. The thread counts of the weft can vary in the range from 6 per cm to 30 per cm. The yarn strength of the warp as well as of the weft can preferably each fall in the range from 250 dtex to 2800 dtex.

TABLE 4

Fabric structure and fiber description

|  |  | Fabric 1 | Fabric 2 | Fabric 3 | Fabric 3 | Fabric 4 | Fabric 5 |
| --- | --- | --- | --- | --- | --- | --- | --- |
| Fabric |  | PBO (Zylon) | POD (Arselon S) | POD (Arselon S) | POD (Arselon S) | POD (Arselon S) | POD (Arselon S) |
| Color |  | honey yellow | orange | orange | orange | yellow | orange |
| Weave |  | — | plain weave | plain weave | plain weave | twill 2/1 | twill 2/1 |
| Yarn type |  | — | filament | filament | filament | staple fiber | filament |
| Warp-thread count | 1/cm | 8 | 8 | 22 | 39 | 26 | 42 |
| Weft-thread count | 1/cm | 6 | 15 | 16 | 22 | 24 | 30 |

TABLE 4-continued

Fabric structure and fiber description

|  |  |  | Fabric 1 | Fabric 2 | Fabric 3 | Fabric 3 | Fabric 4 | Fabric 5 |
|---|---|---|---|---|---|---|---|---|
| Yarn weight warp |  | dtex | 2800 | 2000 | 294 | 294 | 385 | 294 |
| Yarn weight weft |  | dtex | 2800 | 1000 | 294 | 294 | 385 | 294 |
| Filament count warp |  | count | 1800 | 1000 | 200 | 200 | 200 | 200 |
| Filament count weft |  | count | 1800 | 1000 | 200 | 200 | 200 | 200 |
| Width-realted warp thread weight |  | dtex/cm | 22400 | 16000 | 6488 | 11466 | 10010 | 12348 |
| Length-related warp thread weight |  | dtex/cm | 16800 | 15000 | 4704 | 6468 | 9240 | 8820 |
| Surface weight | EN 2288 | g/m$^2$ | 430 | 310 | 166 | 200 | 212 | 225 |
| Thickness | EN 1942 | mm | 0.45-0.48 | 0.62 | 0.25 | 0.28-0.29 | 0.29-0.30 | 0.29-0.30 |
| Elongation at break | EN 14410 | % | 15-30 | 11-18 | 19-20 | 22-23 | 22-23 | 24-27 |
| Breaking force | EN 14410 | N/cm | 1000-2000 | 570-640 | 400-480 | 350-500 | 235-238 | 400-500 |
| Air permeability | ISO 9237 | l/m$^2$s | 16-17 | 95-100 | 35-40 | 8-11 | 230-280 | 220-290 |
| Abrasion class with adhesive | LV 312 |  | B | B | B | B/C | B/C | D |
| Use |  |  | known fabrics |  |  | Example 1 | Example 2 + 3 |  |

*deviating from ISO 9237 a differential pressure of 500 Pa was used

In the yarns of the substrate 4 the fibers are preferably predominantly processed into filament yarns in an advantageous manner. Such woven fabrics made from filament yarns have a higher abrasion resistance than woven fabrics with yarns made from staple fiber yarns. The dense weave with a twill weave or plain weave is advantageous here.

As table 4 also shows the filament counts of a filament yarn can also preferably fall in the range from 200 to 1800 per cm. The fiber fineness of the filaments here can preferably fall in a range from 2 dtex to 3 dtex. This applies; independent from each other, both for the warp and for the weft.

The width-related warp-yarn strength can advantageously fall in the range from 6000 dtex/cm to 25000 dtex/cm. The length-related weft-yarn strength can advantageously fall in the range from 4000 dtex/cm to 17000 dtex/cm. The specific surface-based mass ("grammage") can fall in the range from 200 g/m$^2$ to 450 g/m$^2$. The thickness can fall in the range from 0.20 mm to 0.65 mm, preferably in the range from 0.25 mm to 0.30 mm.

Silicone adhesive, as already mentioned, is particularly suited as temperature-resistant pressure-sensitive adhesive for the adhesive layer 5. Surprisingly, however, it is also possible to achieve good results with adhesives based on polyacrylates or synthetic rubber. To be sure with extreme temperature load a hardening of the adhesive mass results; however, the helical protective wrapping applied with overlap around the strands 2 of the cable set 3 endures due to the good adhesion on the tape pack in the bending test prescribed according to the aging test according to LV 312. In principle the use of solvent acrylates or even the use of acrylate-monomer mixtures or acrylate-prepolymers is also possible. After the coating these are optionally polymerized and cross linked either thermally or using UV radiation.

The adhesive layer 5 can have an application weight (specific surface mass) in the range from 60 g/m$^2$ to 200 g/m$^2$, preferably an application weight in the range from 90 g/m$^2$ to 150 g/m$^2$, particularly preferably to 100 g/m$^2$.

TABLE 5

Adhesive tape overview

|  | Unit | Standard | Example 1 | Example 2 | Example 3 | Example 4 | Example 5 | Comparison 1 | Comparison 2 |
|---|---|---|---|---|---|---|---|---|---|
| Fabric material | — | — | POD | POD | POD | PBO | POD | PET | Glass |
| Substrate construction warp thread count | 1/cm | — | 26 | 42 | 42 | 8 | 8 | 45 | 47 |

TABLE 5-continued

Adhesive tape overview

| | Unit | Standard | Example 1 | Example 2 | Example 3 | Example 4 | Example 5 | Comparison 1 | Comparison 2 |
|---|---|---|---|---|---|---|---|---|---|
| Substrate construction weft thread count | 1/cm | — | 24 | 30 | 30 | 6 | 15 | 25 | 21 |
| Yarn type warp/weft | | | staple fiber yarn | filament yarn | filament yarn | filament yarn | filament yarn | filament yarn | E glass |
| Substrate weight | $g/m^2$ | EN ISO 2286-2 | 212 | 225 | 225 | 430 | 310 | 130 | 130 |
| Adhesive | — | — | acrylate | silicone | acrylate | acrylate | acrylate | acrylate | silicone |
| Adhesive application | $g/m^2$ | EN ISO 2286-2 | 100 | 100 | 100 | 150 | 150 | 90 | 150 |
| Thickness | mm | DIN EN 1942 | 0.30-0.31 | 0.30-0.32 | 0.30-0.32 | 0.50-0.52 | 0.60-0.65 | 0.24-0.25 | 0.15-0.16 |
| Elongation at break | % | DIN EN 14410 | 25-30 | 30-35 | 28-35 | 20-40 | 10-20 | 36-44 | 7.5-8.0 |
| Breaking force | N/cm | DIN EN 14410 | 250-270 | 450-500 | 450-480 | 1500-2500 | 570-640 | 241-285 | 280-330 |
| Adhesive strength on steel | N/cm | DIN EN 1939 | 2.0-2.5 | 2.0-3.5 | 2.5-3.5 | 2.5-4.0 | 2.4-3.8 | 4.0-6.5 | 2.3-3.5 |
| Adhesive strength on tape backs | N/cm | DIN EN 1939 | 2.0-2.5 | 2.5-3.0 | 2.0-3.0 | 2.0-3.0 | 3.0-3.5 | 7.0-9.5 | 2.0-3.5 |
| Unrolling force | N | DIN EN 1944 | 2-9 | 2-9 | 2-9 | 2-9 | 2-9 | 3-7 | 2-8 |
| Fire resistance | — | LV 312 | A | A | A | A | A | B | A |
| Noise damping class | — | LV 312 | B | B | B | B | B | A | A |
| Abrasion class | — | LV 312 | B/C | D | D | B | B | D | A/B |
| Temperature class | — | LV 312 | E | E | E | E | E | D | E |

Table 5 lists various inventive adhesive tapes 1 including their properties in comparison to existing adhesive tapes. The inventive adhesive tapes 1 embodied in this table are the following:

Example 1: Substrate 4 made from staple fiber woven fabric made from a copolymer made from poly-1,4-phenylene-1,3,4-oxadiazole and poly-4,4'-azobenzole-1,3,4-oxadiazole (orange-colored) according to FIG. 7 with a UV acrylate adhesive in the adhesive layer 5.

Example 2: Substrate 4 made from filament fiber woven fabric made from a copolymer made from poly-1,4-phenylene-1,3,4-oxadiazole and poly-4,4'-azobenzole-1,3,4-oxadiazole (orange-colored) according to FIG. 7 with a UV acrylate adhesive in the adhesive layer 5.

Example 3: Substrate 4 made from filament fiber woven fabric made from a copolymer made from poly-1,4-phenylene-1,3,4-oxadiazole and poly-4,4'-azobenzole-1,3,4-oxadiazole (orange-colored) according to FIG. 7 with silicone adhesive in the adhesive layer 5.

The two further examples 4 and 5 of the table relate to inventive adhesive tapes 1 including substrates 4 made from typical known orange-colored woven fabrics ZYLON (Example 4) and ARSELON S (Example 5). These examples 4 and 5 show which values can be achieved with the use of common PBO/POD woven fabrics having coarse weave.

Comparison example 1: substrate 4 made from filament fiber woven fabric made from polyethylene terephthalate (PET) with UV acrylate adhesive in the adhesive layer 5.

Comparison example 2: substrate 4 made from filament fiber woven fabric made from glass fibers with silicone adhesive in the adhesive layer 5.

Inventive adhesive tapes 1 can thus advantageously combine the following properties:

High temperature resistance: >175° C. (class T5 or E according to LV 312), Best flame resistance: class A according to LV 312/ISO 3795.

Good abrasion resistance, in particular class C or D according to LV 312/ISO 6722.

With respect to a comparison with the temperature classes achieved according to the prior art it is noteworthy in particular here that the temperature class T5, not just T3 as according to EP 2 546 317 B1, could advantageously be inventively achieved, and in fact while avoiding the use of health-hazardous anthraquinone. Here the limitation to the continuous use temperature of 175° C. is due to the fact that the relevant standard LV 312 currently lists this as the highest temperature class. In an analogous text with high-temperature-resistant silicone-jacketed lines, resistances with a continuous use temperature of 225° C. could also be seen with example 2.

The line set comprised of a plurality of strands 2 is wrapped with the inventive adhesive tape 1, wherein the strands 2 can include a casing comprised of polyvinyl chloride (PVC), which in FIG. 1 is indicated by the reference number 2a. A high compatibility with the lines is however in particular not only given by PVC and other halogen-containing casing materials, such as, for example, perfluorethylenepropylene (FEP) or ethylene tetrafluoroethylene (ETFE) but also if strands 2 are used in the cable set 3 whose casing 2a is comprised of halogen-free plastics, such as radiation cross linked polyethylene (XPE), polypropylene (PP), or silicone (VMQ).

The invention is not limited to the depicted and described exemplary embodiments, but rather also includes all functionally identical embodiments in the sense of the invention. This applies, for example, to the application weight of the adhesive layer 5, which can vary in wide ranges, but also for other parameters that are adaptable in wide ranges to the respective application case; independent of the color of the inventive adhesive tape 1 and the type of the woven fabric of its substrate 4.

In addition to those already mentioned, in particular for the substrate 4, the following parameter ranges appear as particularly advantageous for the widest application range of an inventive adhesive tape 1:

a thickness in the range from 0.15 mm to 1.50 mm, preferably from 0.20 mm to 0.60 mm, according to the standard EN 1942, an elongation at break in the range of 20% to 50%, preferably from 25% to 35%, according to the standard EN 14410, a breaking force in the range from 100 N/cm to 600 N/cm, preferably in the range from 250 N/cm to 500 N/cm, according to the standard EN 14410, an adhesive force on steel in the range from 2.0 N/cm to 6.0 N/cm, preferably in the range from 2.5 N/cm to 3.5 N/cm, according to the standard DIN EN 1939, an adhesive force on a tape back in the range from 1.5 N/cm to 5.0 N/cm, preferably in the range from 2.0 N/cm to 3.0 N/cm, according to the standard DIN EN 1939, a noise damping of at least class B according to the standard LV 312, an abrasion resistance at least of class B, preferably of class C or D, according to the standard LV 312.

Figure 8:
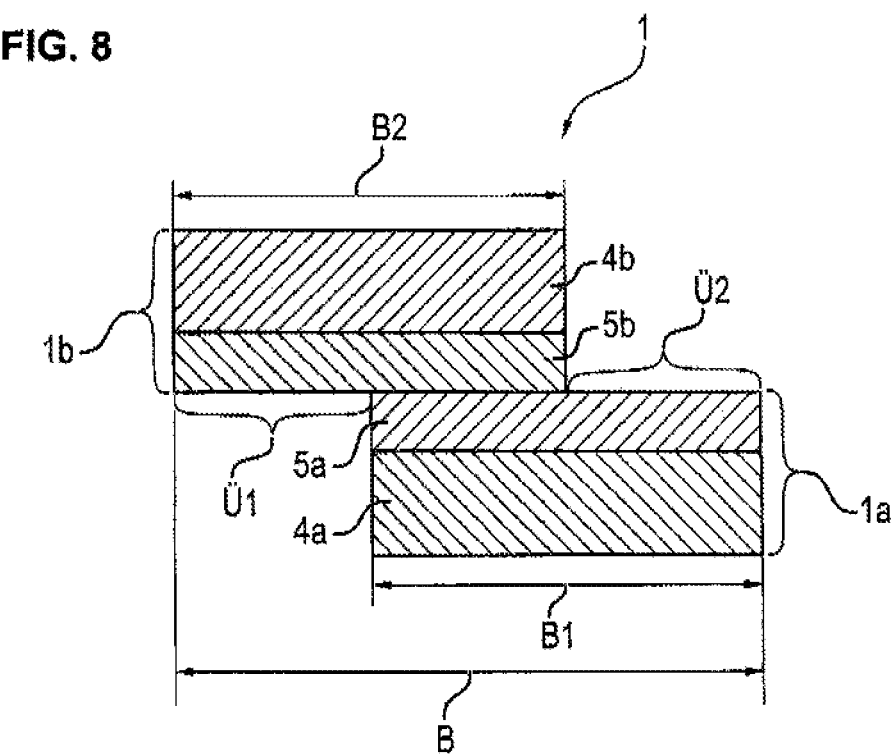
FIG. 8 shows in cross-section a depiction of a further embodiment of an inventive technical adhesive tape.

In the depiction shown in FIG. 8 of a further embodiment of an inventive technical adhesive tape 1 it is provided that on a first tape layer 1a second tape layer 1b is laminated-on, which second tape layer 1b in the case depicted has the same width B2 as the width B1 of the first tape layer 1a. On both sides adhesive overhangs Ü1, Ü2 are provided, wherein the adhesive overhang Ü1 on the one longitudinal side of the adhesive tape 1 is exactly as large as the overhang Ü2 on the other longitudinal side of the adhesive tape 1, however the adhesive layers 5a, 5b face in opposite directions (in FIG. 8 one upward and one downward). The total width B of the adhesive tape 1 results from the sum of the widths of the adhesive overhangs Ü1, Ü2 and the width of the overlapping region. The respective substrates 4a, 4b of the tape layers 1a, 1b can be comprised of different materials, wherein, for example, the substrate 4a of the first tape layer 1a can be comprised of a fleece and the substrate 4b of the other tape layer 1b of a woven fabric. Due to the special construction a contact of the adhesive surfaces to the object to be wrapped is substantially avoided. If the object to be wrapped is, for example, a cable set comprised of a plurality of individual lines or strands 2, these individual lines can thereby move relative to one another and a lower bending stiffness of the wrapped cable set is achieved. In the context of the invention at least one of the two substrate layers 4a, 4b here must be colored.

Figure 9:
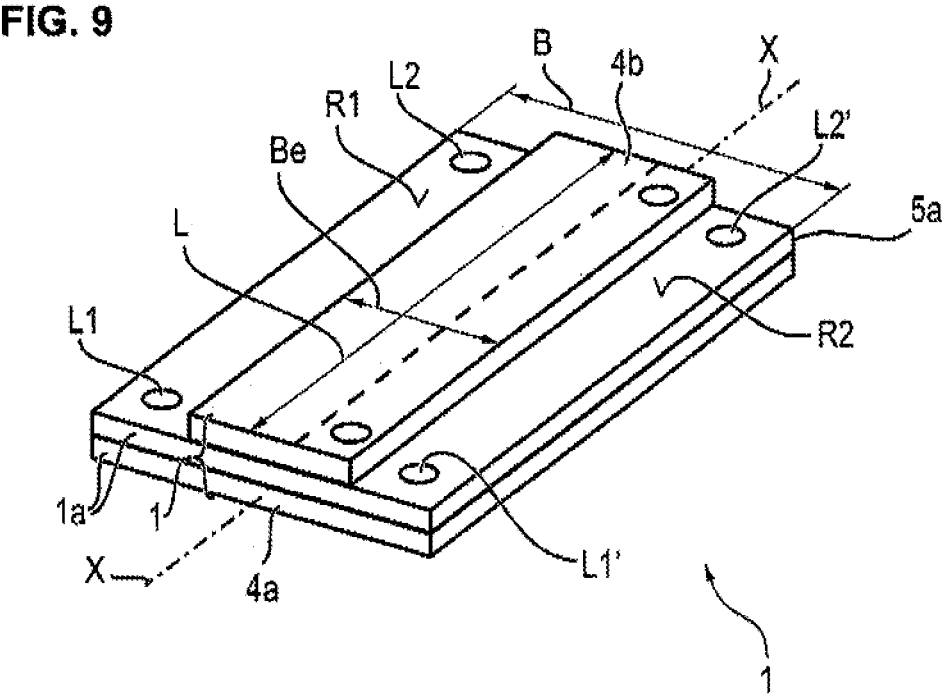
FIG. 9 shows a perspective depiction of a third embodiment of an inventive technical adhesive tape.
Figure 10:
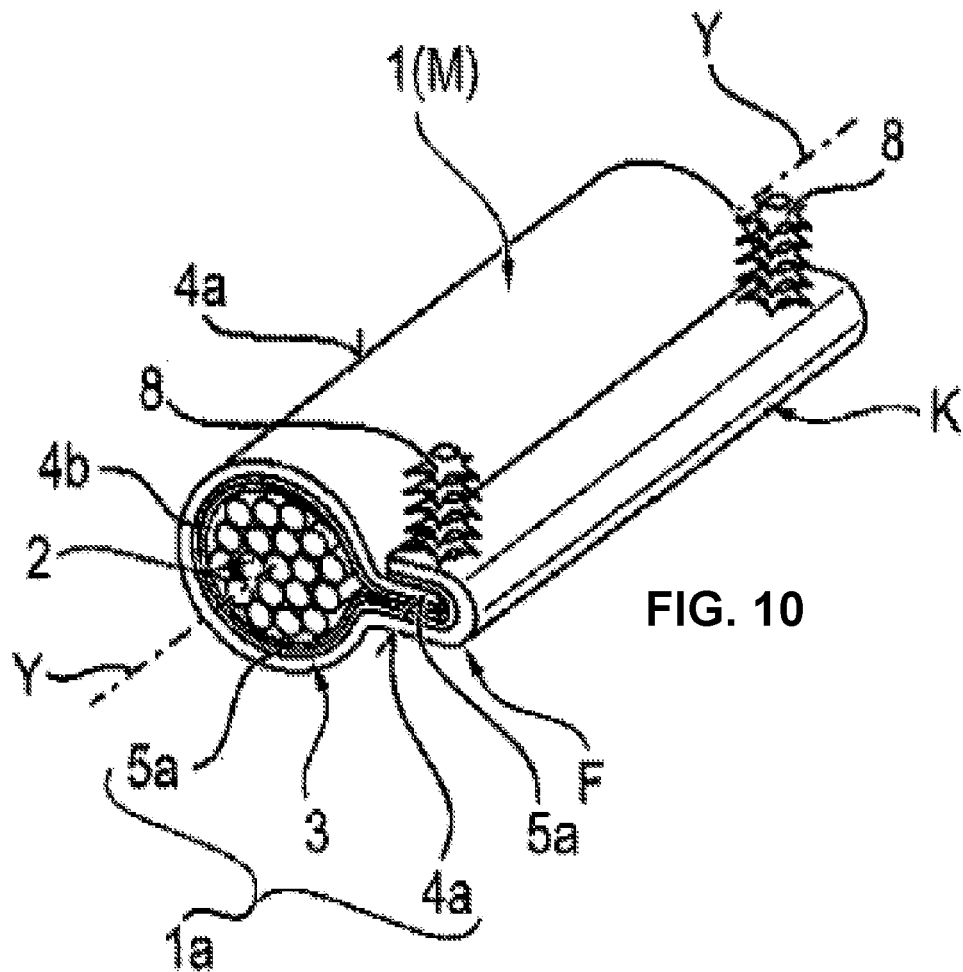
FIG. 10 shows a perspective depiction of a wire harness jacketable using a third embodiment of an inventive technical adhesive tape.

The two further embodiments of the invention shown in FIGS. 9 to 12 are respectively wrapping means 1(M), 1(S) for an elongated object, which, however, according to the application is also subsumed under the term "adhesive tape 1," even if it only has a comparatively small length L. The embodiments depicted can be, for example, sections of a longer tape. In particular in turn in FIGS. 10 and 12 an electrical cable set including strands 2 is depicted as elongated object. The adhesive tape 1 with the width B here is formed by a second substrate layer 4b being laminated-on onto a first tape layer 1a that comprises a first substrate layer 4a with an adhesive layer 5a. The second substrate layer 4b forms a central non-adhesive region of the adhesive tape 1 over a width Be, which central non-adhesive region serves, in particular exclusively, for abutment of the to-be-wrapped strands 2 and is respectively delimited on both sides by an edge region R1, R2. If this is comprised of fleece, for example, in this manner a high noise damping and a high abrasion resistance of the inventive adhesive tape 1 can simultaneously be achieved. In the installed state the two edge regions R1, R2 can, as FIG. 10 shows, respectively together form an attachment flag F lying laterally near the centrally disposed second substrate layer 4b. In each edge region R1, R2 there is at least one hole, in the depicted case two holes (i.e., L1, L2 in R1, and L1', L2' in R2). Here a hole L1, L2 in the one edge region R1 is respectively axially symmetrically associated with a hole L1', L2' in the other edge region such that the holes L1, L2, L1', L2' can be brought together for covering by a folding of the adhesive tape 1 along a main axis X-X (FIG. 9) extending through the central region 4b or by a bending about an axis Y-Y spaced from the adhesive tape 1 (FIG. 10) extending parallel to this main axis X-X, as shown in FIG. 10. The axis Y-Y spaced from the adhesive tape 1 here is identical to the longitudinal axis of the strands 2. In terms of manufacturing technology the holes L1, L2, L1', L2' can more simply and therefore preferably be stamped holes. Due to the prefabricated holes L1, L2, L1', L2', through which; as shown in FIG. 10 but then also in FIG. 12; attachment means 8, such as attachment clips, can be plugged, with the inventive adhesive tape 1a cuff or longitudinal wrapping M, also called a sleeve, can be provided for the strands 2, which due to a special design already contains the possibility of a simple attachment to the attachment means 8 such as a fastener on another component, e.g., on a vehicle chassis. The necessity of a later attachment of attachment means 8 on the longitudinal wrapping M by additional adhesive tapes or the like is thereby omitted. The size and shape of the holes L1, L2, L1', L2' can preferably be matched to the size and shape of the attachment means 8 such that the attachment means 8 is held in the holes L1, L2, L1', L2' by interference, and friction-fit. Here also the respective substrates 4a, 4b of the adhesive tapes 1a, 1b can be comprised of different materials, wherein, for example, the substrate 4b can be comprised of a fleece and the substrate 4a of the first (single) adhesive tape 1a of a woven fabric in order to combine a high noise damping and a high abrasion resistance with each other. In this embodiment at least the outer-lying first substrate layer 4a in the installed state should be colored in the context of the invention.

Figure 11:
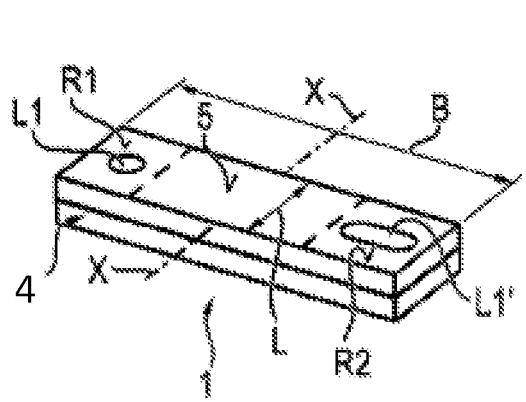
FIG. 11 shows a perspective depiction of a fourth embodiment of an inventive technical adhesive tape.
Figure 12:
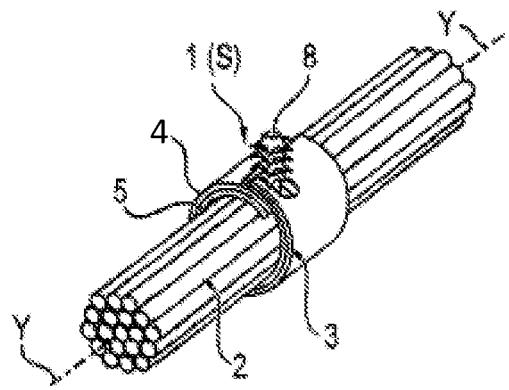
FIG. 12 shows a perspective depiction of a wire harness jacketed with the fourth embodiment of an inventive technical adhesive tape.

In the embodiment depicted in FIGS. 11 and 12, in contrast to the embodiment in FIGS. 9 and 10, —a length L of the wrapping means 1(S), which length L extends in the direction of the main axis X-X, is not larger than a width B of the wrapping means 1(S), which width B extends transverse to the direction of the main axis X-X, whereby the wrapping means 1(S) can form an attachment clip S for the elongated object. This is expressed in FIG. 12, which exemplarily shows an installed state of the corresponding embodiment, by a reference number S placed in brackets behind the reference number 1 in the drawing. Furthermore it is characteristic for this embodiment that only one hole L1, L1' lies in each edge region R1, R2. The embodiment is equipped with adhesive over its entire surface by the adhesive layer 5. However, the adhesive layer 5 could also be omitted and only the substrate 4 used. A feature of this embodiment also consists in that one of the holes L1' is configured as a slot. Due to the slot it is advantageously possible to design the field of use of the inventive wrapping means 1(S) to be universal by being usable for different diameters of the to-be-wrapped object.

it is expressly noted that the exemplary embodiments are not limited to all features in combination, rather each individual feature can also have an inventive meaning in itself separate from all other partial features.

Thus a similar depiction of an adhesive tape 1 as in FIG. 8 is also found in the description of EP 1 315 781 B1, wherein in this context it is mentioned that the other different adhesive tape embodiments described there can also be inventively designed.

For example, in the embodiment according to FIG. 9, in particular if the second substrate layer 4b is comprised of a fleece; a further adhesive layer can be applied to the second substrate layer 4b.

Furthermore the invention is also thus far not limited to the feature combinations in claim 1 and in the other independent claims, but can also be defined by any other desired combination of specific features of all individual features disclosed overall. This means that in principle practically any individual feature of claim 1 and of the other independent claims can be omitted or replaced by at least one individual feature disposed at another point in the application.

While the above description constitutes the preferred embodiment of the present invention, it will be appreciated that the invention is susceptible to modification, variation and change without departing from the proper scope and fair meaning of the accompanying claims.

What is claimed is:

1. A colored adhesive tape for use as a cable-wrapping tape, with a temperature class of at least T3 according to LV 312, comprising, a textile substrate including at least one polymer plastic material, on which an adhesive layer is applied at least on one side of the substrate,
wherein the at least one polymer plastic material of the textile substrate is, or at least comprises, an aromatic, nitrogen-containing polymer from a group of polyoxadiazoles (POD);
wherein the textile substrate is manufactured from a woven fabric having a yarn that comprises the at least one polymer plastic material.

2. The adhesive tape according to claim 1, wherein the at least one polymer plastic material of the textile substrate further comprises an aromatic, nitrogen-containing polymer from a group of polybenzobisoxazoles (PBO), polybenzimidazoles (PBI), or a combination thereof either as a mixture with the polyoxadiazoles (POD) or formed as a copolymer therewith.

3. The adhesive tape according to claim 2 further comprising in that the proportion of polyoxadiazole (POD), polybenzobisoxazole (PBO), polybenzimidazole (PBI), or the copolymer formed therewith inside the textile substrate falls in the range from 50 to 100 mass percent.

4. The adhesive tape according to claim 2, wherein the polybenzobisoxazoles (PBO) is in the form of poly(p-phenylen-2,6-benzobisoxazole) or the polyoxadiazoles (POD) is in the form of poly-1,4-phenylen-1,3,4-oxadiazole.

5. The adhesive tape according to claim 1, wherein the yarn contains fibers of a further textile or non-textile material, or that the fabric of the textile substrate contains yarns of a further textile or non-textile material.

6. The adhesive tape according to claim 5, wherein the fibers or yarns of the further textile material are comprised of one or more of a synthetic polymer, a natural polymer, a polyamide (PA), a polyester (PES), a special polyethylene terephthalate (PET), poly(p-phenylene terephtalamide) (PPTA), poly(m-phenylene terephthalamide) (PMPI), rayon, polyvinyl alcohol (PVAL), polyvinyl acetate (PVAC), polyether-etherketone (PEEK), polyphenylene (PPP), polyphenylene oxide (PPO), polyphenylene sulfide (PPS), and/or polyphenylene ether (PPE).

7. The adhesive tape according to claim 5, wherein the fibers of the further, non-textile material are metal fibers, carbon fibers, glass fibers, or basalt fibers.

8. The adhesive tape according to claim 1 further comprising in that the at least one polymer plastic material of the textile substrate has a yellow, orange, or black color.

9. The adhesive tape according to claim 1 further comprising in that the textile substrate at least sectionally has a color according to RAL corresponding to a number code 2000 yellow-orange, 2001 red-orange, 2002 blood-orange, 2003 pastel orange, 2004 pure orange, 2005 light orange, 2007 light-bright orange, 2008 bright-red orange, 2009 traffic orange, 2010 signal orange, 2011 deep orange, 2012 salmon orange, or 2013 pearl orange.

10. The adhesive tape according to claim 1 further comprising in that the at least one polymer plastic material of the textile substrate contains additional stabilizers for increasing UV resistance.

11. The adhesive tape according to claim 1 further comprising in that the textile substrate is free of colorants.

12. The adhesive tape according to claim 1, further comprising in that the textile substrate contains a colorant composed of a dye, a pigment, or carbon black.

13. The adhesive tape according to claim 1 further comprising in that the at least one polymer plastic material of the substrate contains auxochromic functional groups having the chemical formulas —OH, —NH$_2$, —NHR, —NR$_2$, or —OR with R as an aliphatic or aromatic group, such that a bathochromic shift occurs.

14. The adhesive tape according to claim 1 further comprising in that the textile substrate is composed of a copolymerisate of poly-1,4-phenylen-1,3,4-oxadiazole with poly-4,4'-azobenzole-1,3,4-oxadiazole or poly-3,3'-azobenzole-1,3,4-oxadiazole, wherein the proportion of the poly-4,4'-azobenzole-1,3,4-oxadiazole or of the poly-3,3'-azobenzole-1,3,4-oxadiazole, based on the mass of the poly-1,4-phenylen-1,3,4-oxadiazole, falls in the range from 0.5-5 mass percent.

15. The adhesive tape according to claim 1, wherein the woven fabric of the textile substrate comprises warp threads having a warp-thread count and weft threads having a weft-thread count, wherein the warp-thread count and weft-thread count of the woven fabric is each greater than 20 per cm, and wherein an upper limit of the warp-thread count and weft-thread count of the woven fabric each fall at 80 per cm.

16. The adhesive tape according to claim 1, wherein the textile substrate comprises the woven fabric having a warp and weft yarn weight that is less than 600 dtex.

17. The adhesive tape according to claim 1, wherein the textile substrate comprises the woven fabric having a width-related warp yarn weight that falls in the range from 6000 dtex/cm to 25000 dtex/cm.

18. The adhesive tape according to claim 1, wherein the textile substrate comprises the woven fabric having a length-related weft yarn weight that falls in the range from 4000 dtex/cm to 17000 dtex/cm.

19. The adhesive tape according to claim 1 further comprising in that the adhesive layer comprises a pressure-sensitive self-adhering adhesive, the pressure-sensitive self-adhering adhesive being a silicone adhesive, an acrylate adhesive, or a rubber-based adhesive.

20. The adhesive tape according to claim 1 further comprising in that the adhesive layer has a specific surface mass in the range from 60 g/m² to 200 g/m².

21. The adhesive tape according to claim 1 further comprising in that the adhesive tape has a thickness in the range from 0.15 mm to 1.50 mm according to the standard EN 1942.

22. The adhesive tape according to claim 1 further comprising in that the adhesive tape has an elongation at break in the range of 20% to 50%, according to the standard EN 14410.

23. The adhesive tape according to claim 1 further comprising in that the adhesive tape has a breaking force in the range of 100 N/cm to 600 N/cm, according to the standard EN 14410.

24. The adhesive tape according to claim 1 further comprising in that the adhesive tape has an adhesive force on steel in the range of 2.0 N/cm to 6.0 N/cm, according to the standard DIN EN 1939.

25. The adhesive tape according to claim 1 further comprising in that the adhesive tape has an adhesive force on a tape back in the range of 1.5 N/cm to 5.0 N/cm according to the standard DIN EN 1939.

26. The adhesive tape according to claim 1 further comprising in that the adhesive tape has a noise damping of at least class B according to the standard LV 312.

27. The adhesive tape according to claim 1 further comprising in that the adhesive tape has an abrasion resistance of at least class B according to the standard LV 312.

28. The adhesive tape according to claim 1, wherein the substrate or the adhesive layer comprises a plurality of layers connected to one another.

29. The adhesive tape according to claim 1 further comprising the adhesive tape having a temperature resistance at least of class T4 according to LV 312.

30. The adhesive tape according to claim 1 further comprising the adhesive tape having a flame resistance of at least class B, according to LV 312.

31. A cable harness, comprising the adhesive tape according to claim 1 and a line set comprised of a plurality of strands, which line set is wound by the adhesive tape, wherein the plurality of strands include a casing comprised of a plastic.

32. The cable harness according to claim 31, wherein the casing of the plurality of strands is comprised of a halogen-containing plastic, or of a halogen-free plastic.

33. The cable harness according to claim 31 characterized by the cable harness having a temperature resistance at least of class T4, according to LV 312.

34. The cable harness according to claim 31 characterized by the cable harness having a flame resistance at least of class B, according to LV 312.

35. The cable harness according to claim 31 further comprising in that the adhesive tape or the textile substrate forms a cuff or a clip with an interior around the line set comprised of the plurality of strands.

36. A method of manufacturing a colored adhesive tape for use as a cable-wrapping tape, having a temperature class of at least T3 according to LV 312, wherein the method comprises:

manufacturing a textile substrate from a woven fabric having a yarn that comprises at least one polymer plastic material, wherein the at least one polymer plastic material is, or at least comprises, an aromatic, nitrogen-containing polymer from the group of polyoxadiazoles (POD); and applying an adhesive layer on at least one side of the textile substrate.

37. The method according to claim 36, wherein the at least one polymer plastic material is comprised exclusively of polyoxadiazoles (POD), a copolymer of polyoxadiazoles (POD) with polybenzobisoxazoles (PBO) or polybenzimidazoles (PBI), or a mixture of polyoxadiazoles (POD) with polybenzobisoxazoles (PBO) or polybenzimidazoles (PBI).

* * * * *